(12) United States Patent
Bronder et al.

(10) Patent No.: US 7,764,720 B1
(45) Date of Patent: Jul. 27, 2010

(54) MULTI-TONE DRIVEN HIGH-POWER NARROW-LINEWIDTH RARE EARTH DOPED FIBER AMPLIFIER

(75) Inventors: Timothy J. Bronder, Albuquerque, NM (US); Iyad A. Dajani, Albuquerque, NM (US); Clint M. Zeringue, Albuquerque, NM (US); Thomas M. Shay, Albuquerque, NM (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 232 days.

(21) Appl. No.: 12/198,308

(22) Filed: Aug. 26, 2008

(51) Int. Cl.
    *H01S 3/30* (2006.01)
(52) U.S. Cl. .............................. 372/6; 372/3
(58) Field of Classification Search ............ 372/3, 372/6
    See application file for complete search history.

(56) References Cited

OTHER PUBLICATIONS

P. Wessels et al, "Novel suppression scheme for Brillouin scattering", Optics Express 12, pp. 4443-4448, Sep. 20, 2004.

E. Lichtman et al, "Stimulated Brillouin scattering excited by two pump waves in single-mode fibers", J. Optical Soc. of America, pp. 1397-1403, vol. 4 No. 9 Sep. 1987.

*Primary Examiner*—Armando Rodriguez
(74) *Attorney, Agent, or Firm*—Kenneth E. Callahan (57) ABSTRACT

A method to increase the output power of narrow-linewidth rare earth-doped fiber amplifiers by suppressing simulated Brillouin scattering. The fiber amplifier is seeded with two or more lasers having frequencies and input powers that are sufficiently different. The seed signal with the highest emission cross section (e.g., signal 2) initially experiences the greatest gain. If signal 2 is also given sufficiently greater input power than signal 1, it will be amplified to its maximum value before the seed signals have reached the midpoint of the gain fiber. Beyond that point, the signal having the lower emission and absorption cross sections (signal 1) and significantly lower input power will continue to experience gain by power transfer from both signal 2 and the pump light, attaining a power output well beyond what the maximum output would have been had the amplifier been illuminated with a single frequency beam. This technique effectively reduces the Stokes light of signal 1, whereby higher power narrow-linewidth optical fiber amplifiers may be realized.

4 Claims, 9 Drawing Sheets

Example 1 Parameters

FIG. 3

Example 1 Parameters

FIG. 4

Example 2 Parameters

FIG. 5

Example 2 Parameters

FIG. 6
Example 3 Parameters

FIG. 7
Example 3 Parameters

FIG. 8
Example 4 Parameters

FIG. 9

MULTI-TONE DRIVEN HIGH-POWER NARROW-LINEWIDTH RARE EARTH DOPED FIBER AMPLIFIER

STATEMENT OF GOVERNMENT INTEREST

The conditions under which this invention was made are such as to entitle the Government of the United States under paragraph I(a) of Executive Order 10096, as represented by the Secretary of the Air Force, to the entire right, title and interest therein, including foreign rights.

BACKGROUND OF THE INVENTION

The present invention relates generally to optical fibers and in particular to narrow linewidth high-power continuous wave or quasi-continuous wave fiber lasers and amplifiers.

Stimulated Brillouin scattering (SBS) is a limiting factor in the evolution of fiber lasers and amplifiers towards higher power and is also harmful to optical communications signals. Fundamentally, SBS is a nonlinear process that describes the scattering of laser light by a travelling hypersonic acoustic grating. As a by-product, Doppler-shifted scattered light, known as Stokes light, is generated. The interaction of the Stokes light with the laser light induces electrostriction in the medium and thus tends to re-enforce the acoustic wave. In an optical fiber, momentum conservation requires the Stokes light to propagate in the opposite direction as the laser light. It is well-known in the art that once a certain amount of optical power is coupled into or is generated in the fiber, significant backscattered Stokes light is produced causing the performance of the fiber to degrade. The SBS process is characterized by a gain spectrum that determines the SBS response of the medium to the pump frequency. Measurements in silica fibers have established a Brillouin shift of approximately 16 GHz and a linewidth of approximately 40 MHz at a wavelength of 1064 nm. The effective SBS gain can be diminished through the use of a broad linewidth seed laser. However, several important applications including coherent beam combination for directed energy purposes, harmonic generation, lidar, and gravitational wave detection require the use of high power narrow linewidth optical fiber amplifiers and lasers. Therefore, there is a need for techniques that mitigate the SBS process.

A commonly-used approximate formula to calculate the SBS threshold in optical fibers was proposed in 1972 by R. G. Smith in Applied Optics 11, pp. 2489-2494:

$$P_{th} \approx 21 \, A_{eff}/g_B L_{eff} \tag{1}$$

where $A_{eff}$ is the optical effective area, $L_{eff}$ is the effective interaction length, and where $g_B$ is the peak value of the Brillouin gain. Therefore, The SBS threshold can be increased by decreasing the effective length of the fiber, increasing the effective area, or somehow manipulating the Brillouin gain in the fiber. The increase in the SBS threshold through the decrease of length is limited by the gain requirements in the fiber. Moreover, increased gain per unit length through the use of higher concentrations of rare earth elements is beset with problems associated with photodarkening and solubility limits. Much work has been done to increase the effective area of the fiber through the use of large mode area (LMA) fibers. While conventional LMA fiber designs have been successful in delivering single mode power outputs exceeding 100 watts, there is general agreement that new approaches are required for further enhancement is of the power.

A variety of experimental efforts have been attempted or proposed to reduce the SBS threshold through the manipulation of the SBS gain via the fiber doping profile (e.g. U.S. Pat. Nos. 7,130,514 and 7,167,621). In U.S. Pat. No. 5,851,259 by Clayton et al., the SBS threshold is reduced by introducing a modulation in the tension applied to the fiber during the draw process. This idea was expanded on in U.S. Pat. No. 6,542,683 by Evans et al. as a permanent, non-uniform stress is imparted to the fiber core through non-uniform thermal expansion and viscosity profiles. The latter inventor shows that a simple modulation of tension during the draw process leads to a marginal increase in the SBS threshold. The technique is limited by the fact that a change in the draw tension leads to a change in the fiber diameter. The latter inventor did not envision a fiber which could be manufactured with polarization maintaining properties.

In 2004, Wessels et al. reported in Optics Express 12, pp. 4443-4448 on a 72 m-long fiber amplifier pumped with two seed lasers. The two seed signals were separated by twice the SBS shift. The Stokes generated light from one laser signal coupled into the second laser light, allowing the first laser signal to grow to twice the power level of a single seed amplifier. One significant drawback of this technique is the requirement that the two seed signals have to be precisely tuned. Another significant drawback is that at such a small frequency separation, a parasitic process known as four-wave mixing (FWM) is prominent, leading to the generation of several frequency sidebands. This broadening of the optical power spectrum precludes the application of this method to fiber laser applications that require well-defined spectra such as coherent beam combining.

While some of the foregoing patents and applications may describe techniques that can lead to improvement in the power output of narrow linewidth amplifiers, each can have limitations. Accordingly, there remains a need in the art for new methods that address prior deficiencies.

SUMMARY OF THE INVENTION

The present invention for mitigating SBS effects is a novel technique that takes advantage of the emission and absorption properties of ytterbium (Yb)-doped fibers as well as other rare-earth doped amplifiers. If a fiber amplifier is constructed with two input seeds and these signals have a large enough frequency separation (i.e. larger than twice the Brillouin shift) the scientific literature teaches that each signal will reach its SBS threshold independently and effectively double the total power out of a single amplifier, albeit in two colors. This effect is discussed Wessels et al. in 2004 (Optics Express 12, pp. 4443-4448) and also in 1987 by Lichtman et al. (Journal of the Optical Society of America B, pp. 1397-1403), and it has been posited that such methods cannot amplify either input signal to powers higher than that of the single signal case. The present invention shows that this is indeed not the case as there are certain design conditions of input seed power ratios and wavelength (frequency) separation that if realized, will allow enhancement of the power output at one of the input frequencies. if the two input signals have a large enough separation (on the order of 10 nm), then remarkable effects based on the physics of the absorption and emission cross sections of the dopant used can be taken advantage of to mitigate SBS. For the case of an Yb-doped amplifier seeded simultaneously with a 1064 nm and a 1050 nm laser light, for example, the higher emission cross section of the 1050 nm light, combined with a higher pump power and skewed input seed ensures that this signal will reach its maximum amplification at a distance roughly halfway along the fiber in ques-

DESCRIPTION OF THE PREFERRED EMBODIMENT

The present invention is a method of reducing the stimulated Brillouin scattering (SBS) effect in order to allow for the design of high power narrow linewidth lasers and amplifiers. The invention is applicable to various waveguide structures comprised of core and cladding regions in which most of the light power is contained in the core. The invention will also work in conjunction with other SBS suppressing schemes.

As an overview, a fiber amplifier consists of a silica core doped with a rare earth element most notably erbium (Er), ytterbium (Yb), or thulium (TM). The purpose of the rare earth dopant is to provide laser gain. The core is also injected with other dopants for other purposes. For example, germanium is used to raise the effective index of refraction of the core and allow guiding via total internal reflection. Those practicing the art recognize that laser gain is achieved when a sufficient number of electrons are made to occupy the upper energy lasing level of a rare earth ion. This process is known as population inversion and can be achieved by injecting what is known in the art as pump light into the fiber. This process is typically facilitated by designing double clad fibers which allow significant portion of pump light to propagate in the inner cladding before being absorbed in the core. Simultaneously, a laser beam called the "signal" is coupled into the core. As this signal travels along the length of the fiber, it sees laser gain due to the population inversion and is amplified. As a result, power is typically transferred from the low brightness multi-mode pump light and into the high brightness single mode light making the amplifier suitable for a variety of applications. As discussed above, SBS can limit this process and will thus impose an upper limit (threshold) on the amount of signal light that can be generated in a given amplifier. The present invention makes use of the simultaneous illumination of the fiber amplifier by two or more seed signals possessing different frequencies in order to raise the power output of one of the signals to levels well beyond what the maximum output would have been had the amplifier been illuminated with just a single frequency beam.

Figure 1:
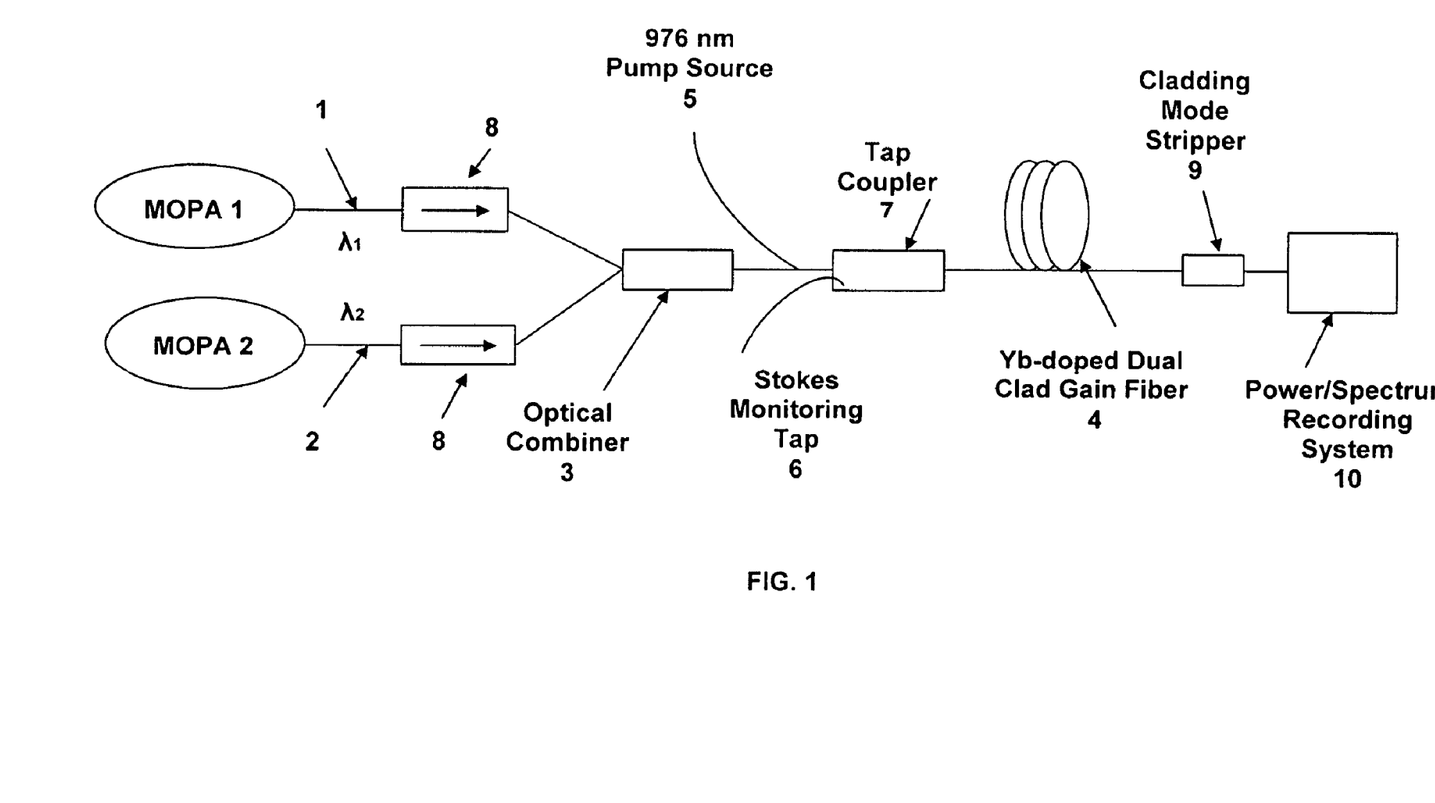
FIG. 1 is a block diagram describing the construction of a two-tone laser amplifier for increased 1064 nm signal amplification and SBS mitigation.

FIG. 1 illustrates one possible experimental implementation of the invention. Two master oscillator power amplifiers (MOPAs) are used to generate two beams of seed light 1, 2 oscillating at different frequencies. This also means that the wavelengths of the two beams will be different. The two beams are brought together in an optical combiner 3 before being coupled into the gain fiber 4 whereby amplification of the light signals occurs. As discussed above, the gain fiber 4 contains a guiding core that is doped with a rare-earth element. In order to cause population inversion, the gain fiber is pumped 5 by an array of diode lasers. A typical pump wavelength for a Yb-doped amplifier, for example, is in the vicinity of 976 nm. The double clad fiber amplifier is spliced onto a cladding mode stripper 9 which will couple out all unused pump light. A diagnostic leg is imaged with an optical spectrum analyzer (OSA) 10 to ensure the appropriate power ratio between the two input seed signals. The backward-travelling Stokes light is monitored using a 1% backward tap coupler 7 spliced into the fiber and imaged with another OSA. To ensure the amplifier operates without allowing any backward scattered light that can damage the seed sources, optical isolators 8 are employed in the set-up.

Regardless of the particular experimental implementation of this invention, there are two parameters which are key components of the design that need to be controlled in order to obtain power enhancement of one of the signal laser beams. These two parameters are the power ratios among the seed signals and the wavelength (or equivalently frequency) separations. Prior to this invention, the interplay of these parameters was not understood and in fact the scientific literature taught that no power enhancement can be obtained in the output power of any one of the signal lasers. In our design, the wavelength separation is approximately 10 nm or greater and the ratio of the input seed powers is skewed substantially. Furthermore, the skew in the power ratio is such that the signal light that provides the greatest amplifier output has the lowest seed power input. Since the principle objective of this invention is to generate enhanced narrow linewidth power in only one of the tones, the signal light with the highest power input (and therefore lowest power output) need not possess narrow linewidth. In fact, the use of a broad line width input in one of the signals can lead to better power enhancement of the narrow line width output as will be illustrated in Example (4).

The above discussion will be more obvious following the reasoning presented henceforth. We restrict our analysis to two seed beams coupled into the fiber amplifier. But those artisans in the field will recognize that our invention can be implemented using more than two seed beams. It is well-known in the art that each laser beam experiences gain or loss due to interaction with the gain medium and that each laser light generates its own Stokes light which travels in the opposite direction. Starting with Maxwell's equations and using standard derivation procedures used in the field of nonlinear optics, we obtain the following two equations that describe the spatial evolution of the intensities of the two signals:

$$\frac{dI_1}{dz} = g_1 I_1 - g_B I_{1S} I_1, \quad (2)$$

$$\frac{dI_2}{dz} = g_2 I_2 - g_B I_{2S} I_2 \quad (3)$$

where $g_1$ and $n_1$ are the laser gain and the linear index of refraction for the signal seed oscillating at $\omega_1$, respectively, and where $g_2$ and $n_2$ are the laser gain and the linear index of refraction for the signal seed oscillating at $\omega_2$, respectively. The laser gain coefficients for the two frequencies are given by:

$$g_1 = N_2 \sigma_1^{(e)} - N_1 \sigma_1^{(a)}, \quad (4)$$

$$g_2 = N_2 \sigma_2^{(e)} - N_1 \sigma_2^{(a)}, \quad (5)$$

where $N_1$ and $N_2$ are the population densities of the upper and lower energy levels, respectively, $\sigma_1^{(e)}$ and $\sigma_1^{(a)}$ are the emission and absorption cross sections for $\omega_1$, respectively, and where $\sigma_2^{(e)}$ and $\sigma_2^{(a)}$ are the emission and absorption cross sections for $\omega_2$, respectively. The population densities at steady state can be obtained using standard laser physics treatment of quasi-two level systems. The total population density is equal to the rare-earth ion density in the material, $N_0$. The upper level population density is related to the absorption and emission cross sections and the signal and pump waves intensities by:

$$N_2 = \frac{\left(\frac{\sigma_1^{(a)}}{\hbar\omega_1} I_1 + \frac{\sigma_2^{(a)}}{\hbar\omega_2} I_2 + \frac{\sigma_p^{(a)}}{\hbar\omega_p}\right) N_0}{\frac{(\sigma_1^{(a)} + \sigma_1^{(e)})}{\hbar\omega_1} I_1 + \frac{(\sigma_2^{(a)} + \sigma_2^{(e)})}{\hbar\omega_2} I_2 + \frac{(\sigma_p^{(a)} + \sigma_p^{(e)})}{\hbar\omega_p} I_p + \frac{1}{\tau}} \quad (6)$$

where $\tau$ is the lifetime of the upper laser level. For a co-propagating pump in a double clad configuration, the evolution of the pump intensity is given by:

$$\frac{dI_p}{dz} = \frac{d_{core}^2}{d_{clad}^2} (N_2 \sigma_p^{(e)} - N_1 \sigma_p^{(a)}) I_p \quad (7)$$

Where $d_{core}$ and $d_{clad}$ are the diameters of the core and cladding regions, respectively. The two Stokes waves are initiated from noise and travel in the backward direction. Stokes gain is obtained through SBS scattering and laser gain. The evolution of the Stokes intensities is given by:

$$\frac{dI_{1S}}{dz} = -g_1 I_{1S} - g_B I_1 I_{1S}, \quad (8)$$

$$\frac{dI_{2S}}{dz} = -g_2 I_{2S} - g_B I_2 I_{2S}, \quad (9)$$

It is well-known in the art that the emission and absorption cross sections for rare earth-doped silica are different for different frequencies (wavelengths). These cross sections have been extensively studied and their values are well-documented. As an example, for Yb-doped silica the emission and absorption cross sections at 1070 nm are approximately 25% and 60% less than those at 1050 nm light, respectively.

Practical fiber amplifiers are typically pumped at frequencies possessing high absorption cross sections. Referring to Equations (2) and (3), the laser gain experienced by the two seed frequencies will be different. For a co-propagating pump configuration, the upper level population density, $N_2$, is relatively high in the proximity of the input end of the fiber and the signal with the higher emission cross section experiences the greatest gain. For simplicity in presenting our argument, we will refer to this signal as signal 2 and the other signal as signal 1. If pumping power is high and the input power of signal 2 was significantly larger than that of signal 1, the former is amplified to its maximum value before these signals have propagated to the midpoint of the fiber. This power value is much higher than that of signal 1 at that point of the fiber. Due to significant absorption of the pump light, the population inversion beyond that point is such that signal 2 will become attenuated. Equation (3) indicates that occurs when $\sigma_2^{(e)} N_2 > \sigma_2^a N_1$. However, if the absorption cross section of signal 1 is much smaller than that of signal 2, the former will continue to experience laser gain leading to a power transfer from both signal 2 and the pump light and into signal 1. The reduction to in the Stokes light is due to the suppressed amplification of signal 1 in a significant portion of the fiber as can be inferred from Equations (8) and (9).

The following examples will make those practicing the art appreciate the design parameters needed to implement this invention. The design was run using a fully developed simulation system that extends beyond the simplified equations discussed above.

Figure 2:
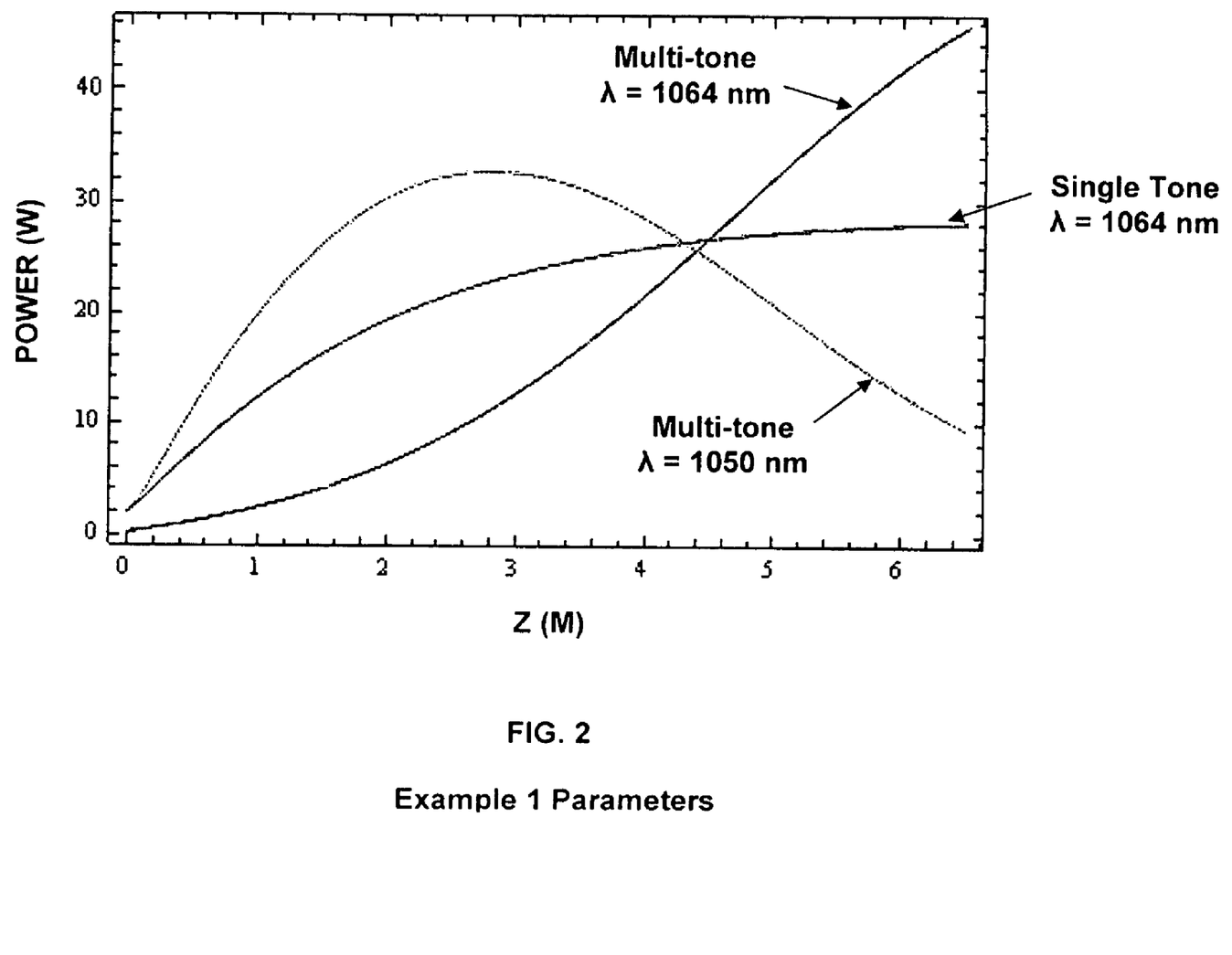
FIG. 2 is a plot of the power vs. gain fiber length (Z) that illustrates the new SBS mitigation technique as per Example 1 with a single tone seeding ($\lambda$=1064 nm) plotted for comparison.
Figure 3:
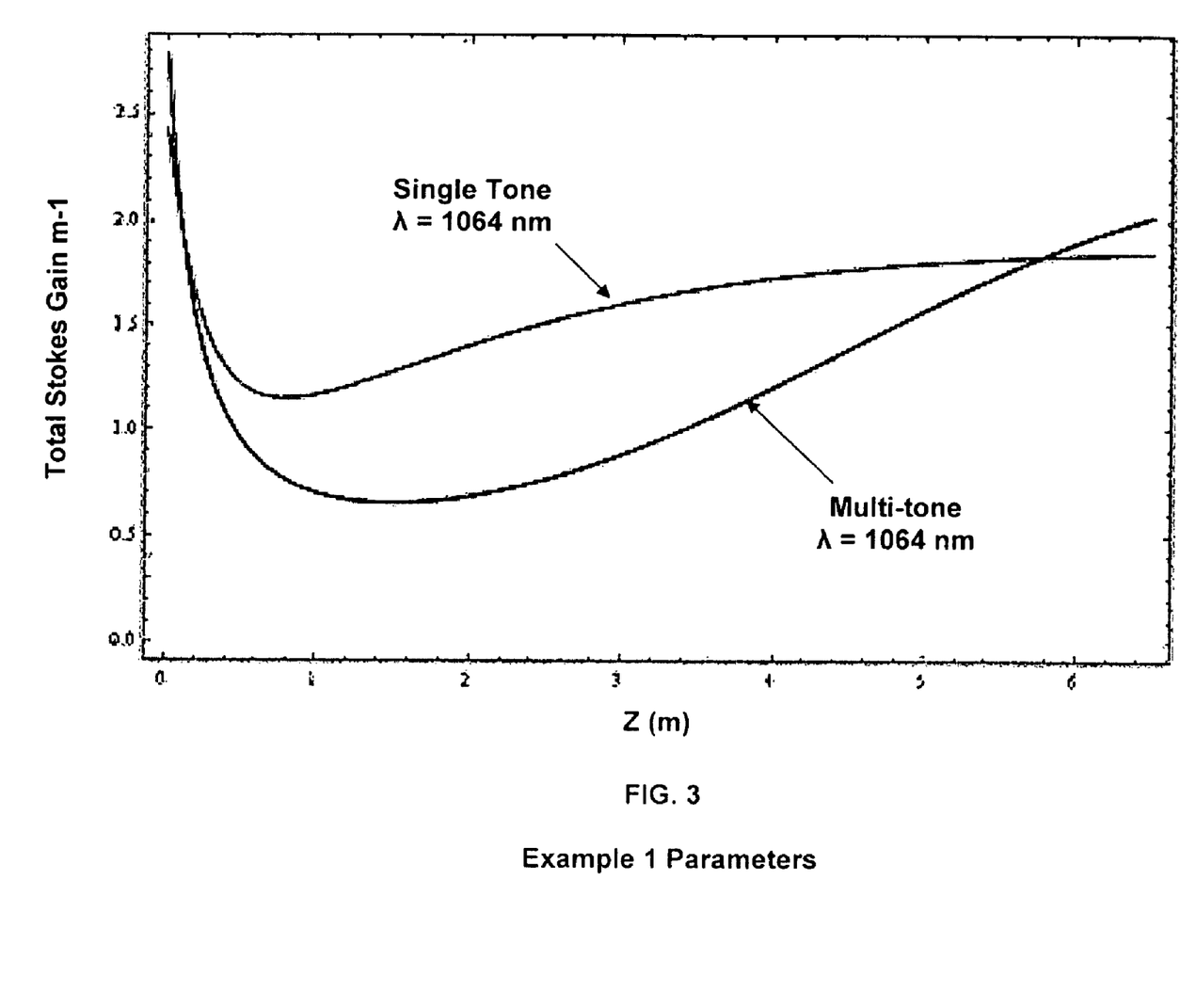
FIG. 3 is a plot showing reduced Stokes gain due to two-tone seeding for a 25/400 Yb-doped fiber amplifier as per Example 1.

Example 1: A 6.5 m Yb-doped fiber with a core mode field diameter (MFD) of 25 μm and an inner cladding MFD of 400 μm. The dopant level in the core is $1.2 \times 10^{26}/m^3$. The amplifier is seeded with narrow linewidth (<1 MHz) 1050 nm and narrow linewidth (<1 MHz) 1064 nm light beams with a power ratio of 9:1 and total input power of 2 W. The pump wavelength is 977 nm. For single seed input, the maximum power output of this amplifier will be approximately 28 W, while for this two-tone case, 46 W of power will be obtained in the 1064 nm light. FIG. 2 shows the spatial evolution of the two-tone case and compares it to that of the single tone. FIG. 3 illustrates the reduction in the Stokes gain. For comparison purposes, this figure was generated by reducing the pump light for the two-tone case such that the output at 1064 nm was the same as the single-tone case.

Figure 4:
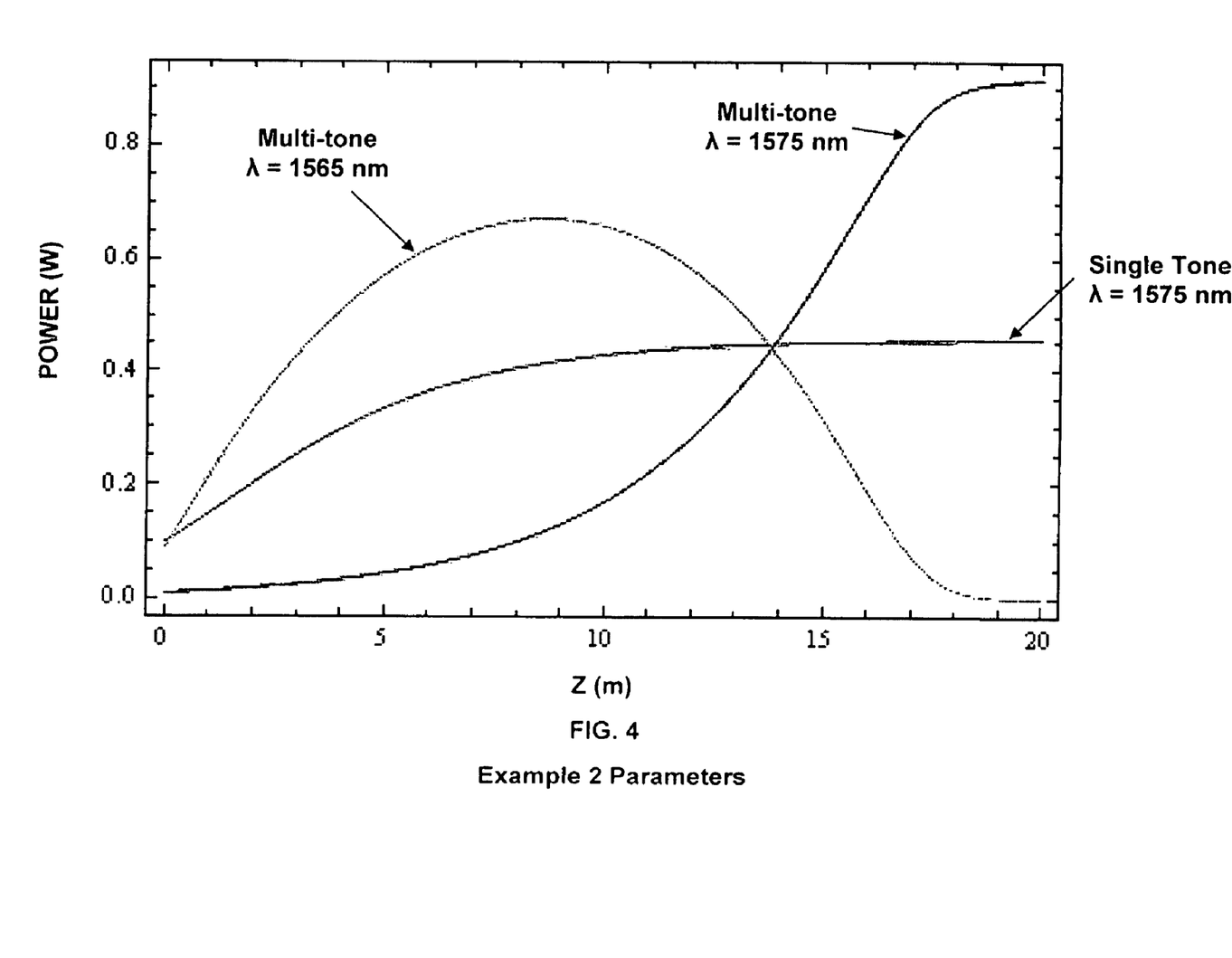
FIG. 4 is a plot showing the evolution of two laser signals along the direction of propagation (Z) in a 5/10 Er-doped fiber amplifier as per Example 2. For comparison, the case of single tone seeding is plotted.
Figure 5:
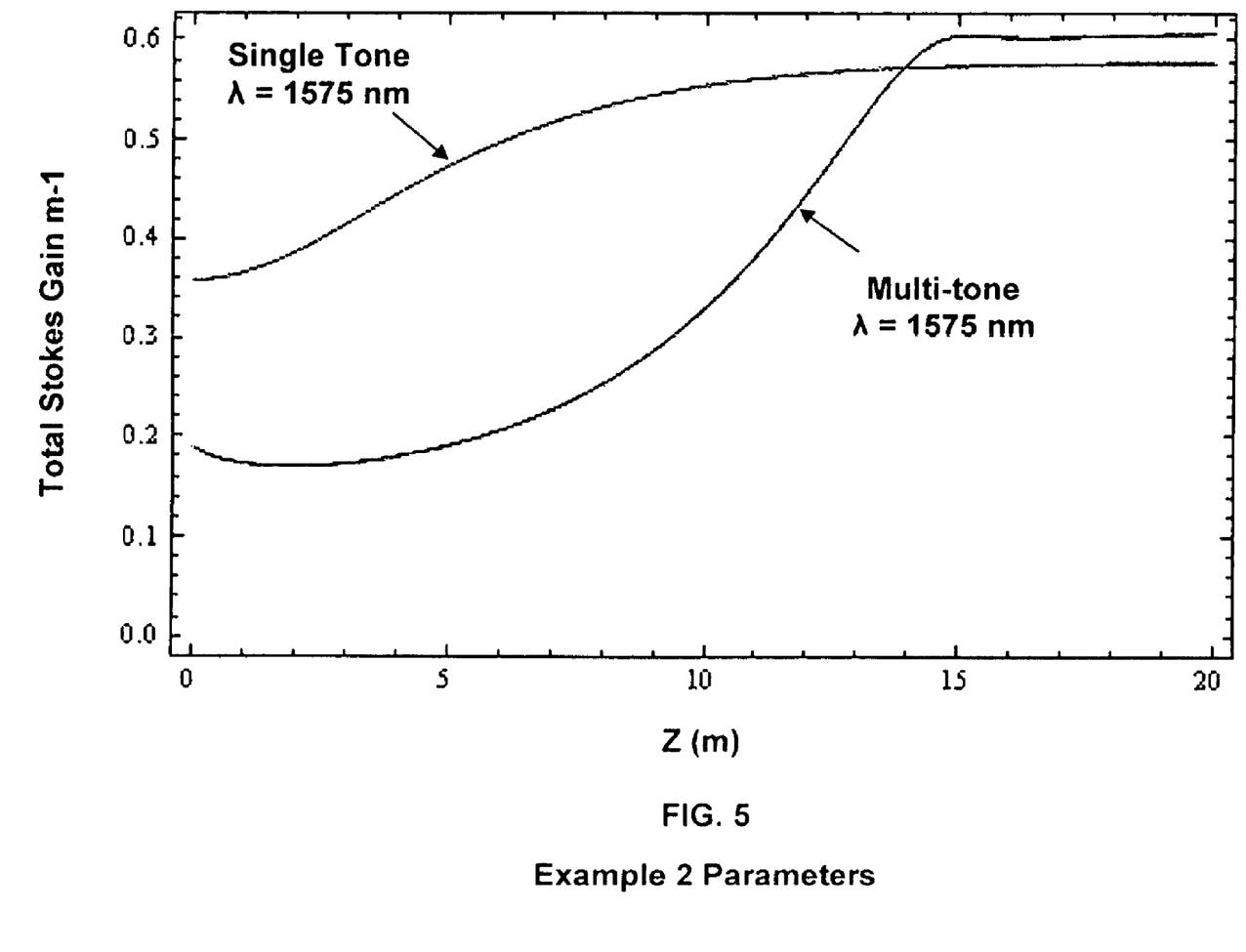
FIG. 5 is a plot comparing the total field amplitude Stokes gain for a single tone to that for the multi-tone case of Example 2.

Example 2: A 20 m Er-doped fiber with a core mode field diameter (MFD) of 5 μm and an inner cladding MFD of 10 μm. The dopant level in the core is $7 \times 10^{24}/m^3$. The amplifier is seeded with narrow linewidth (<1 MHz)1565 nm and narrow linewidth (<1 MHz) 1575 nm light beams with a power ratio of 4:1 and total input power of 100 mW. The pump wavelength is 980 nm. For single seed input, the maximum power output of this amplifier will be approximately 0.45 W, while for this two-tone case 0.9 W of power will be obtained in the 1575 nm light. FIG. 4 shows the spatial evolution of the two-tone case and compares it to that of the single tone. Note that the power output in the 1575 nm light is doubled. FIG. 5 illustrates the reduction in the Stokes gain. For comparison purposes, this figure was generated by reducing the pump light for the two-tone case such that the output at 1575 nm was the same as the single-tone case.

Figure 6:
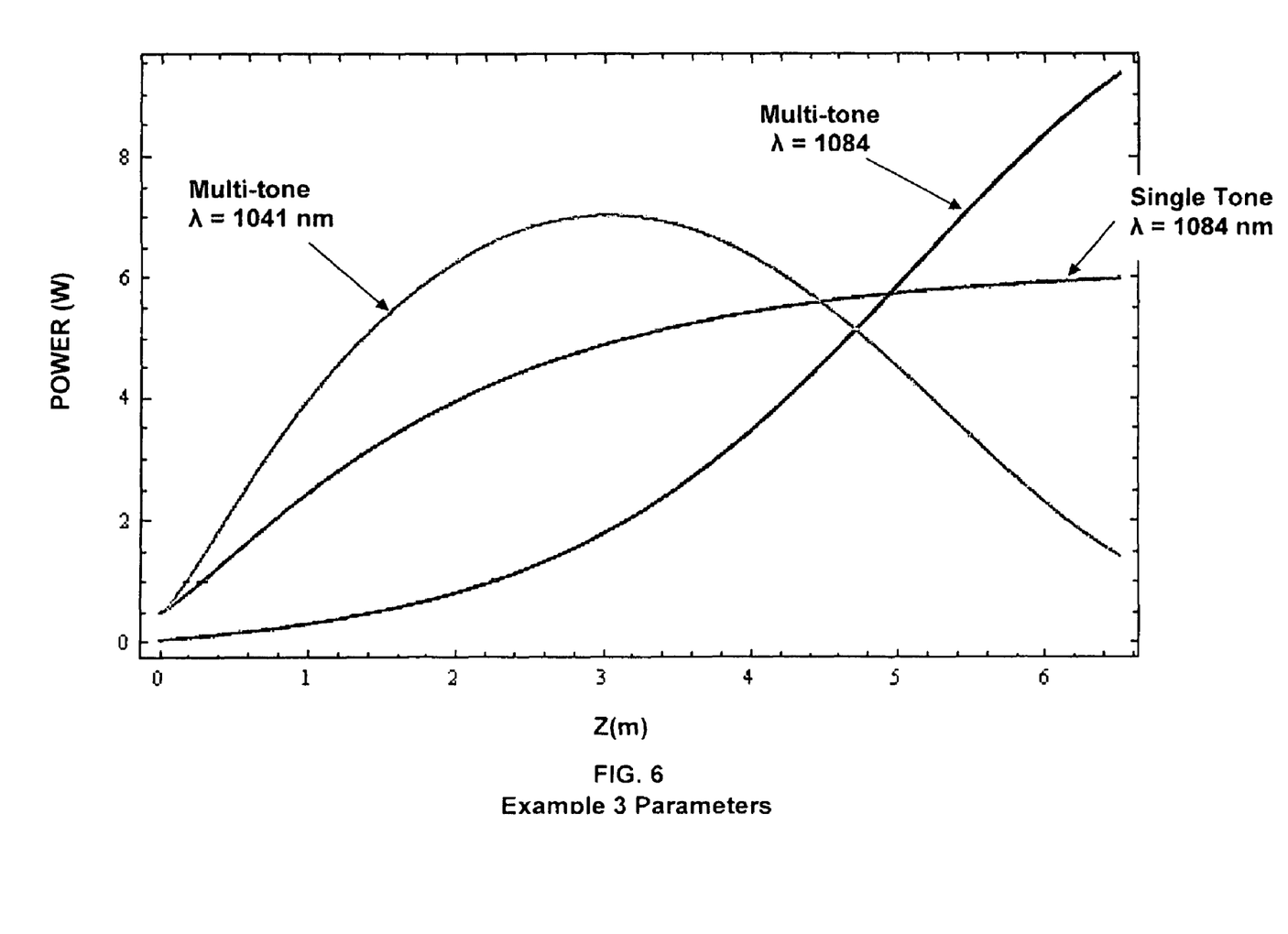
FIG. 6 is a plot of the evolution of two laser signals along the direction of propagation in a 10/125 Yb-doped fiber amplifier (Example 3) with the case of a single tone seeding plotted for comparison.
Figure 7:
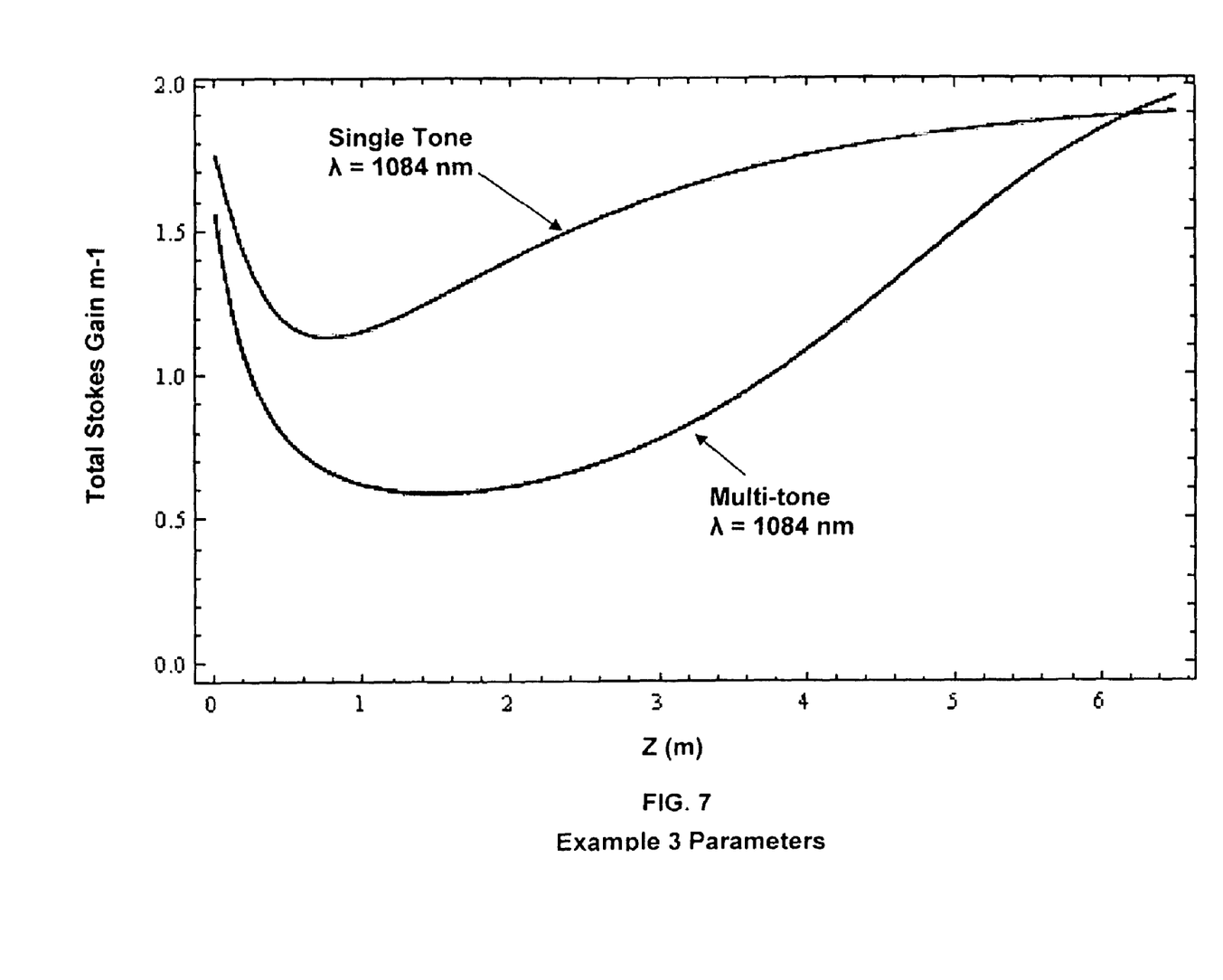
FIG. 7 is a plot showing the reduced Stokes gain due to two-tone seeding for the 10/125 Yb-doped fiber amplifier of Example 3.

Example 3: A 6.5 m Yb-doped fiber with a core mode field diameter (MFD) of 10 μm and an inner cladding MFD of 125 μm. The dopant level in the core is $1.2 \times 10^{26}/m^3$. The amplifier is seeded with narrow linewidth 1041 nm and narrow linewidth (<1 MHz) 1084 nm light beams with a power ratio of 9:1 and total input power of 0.5 W. The pump wavelength is 977 nm. For single seed input, the maximum power output of this amplifier will be approximately 6 W. For the two-tone case approximately 9.5 W of power will be obtained in the 1084 nm light for an enhancement of approximately 60%. FIG. 6 shows the spatial evolution of the two-tone case and compares it to that of the single tone. FIG. 7 illustrates the reduction in the Stokes gain. For comparison purposes, this figure was generated by reducing the pump light for the two-tone case such that the output at 1084 nm was the same as the single-tone case.

Figure 8:
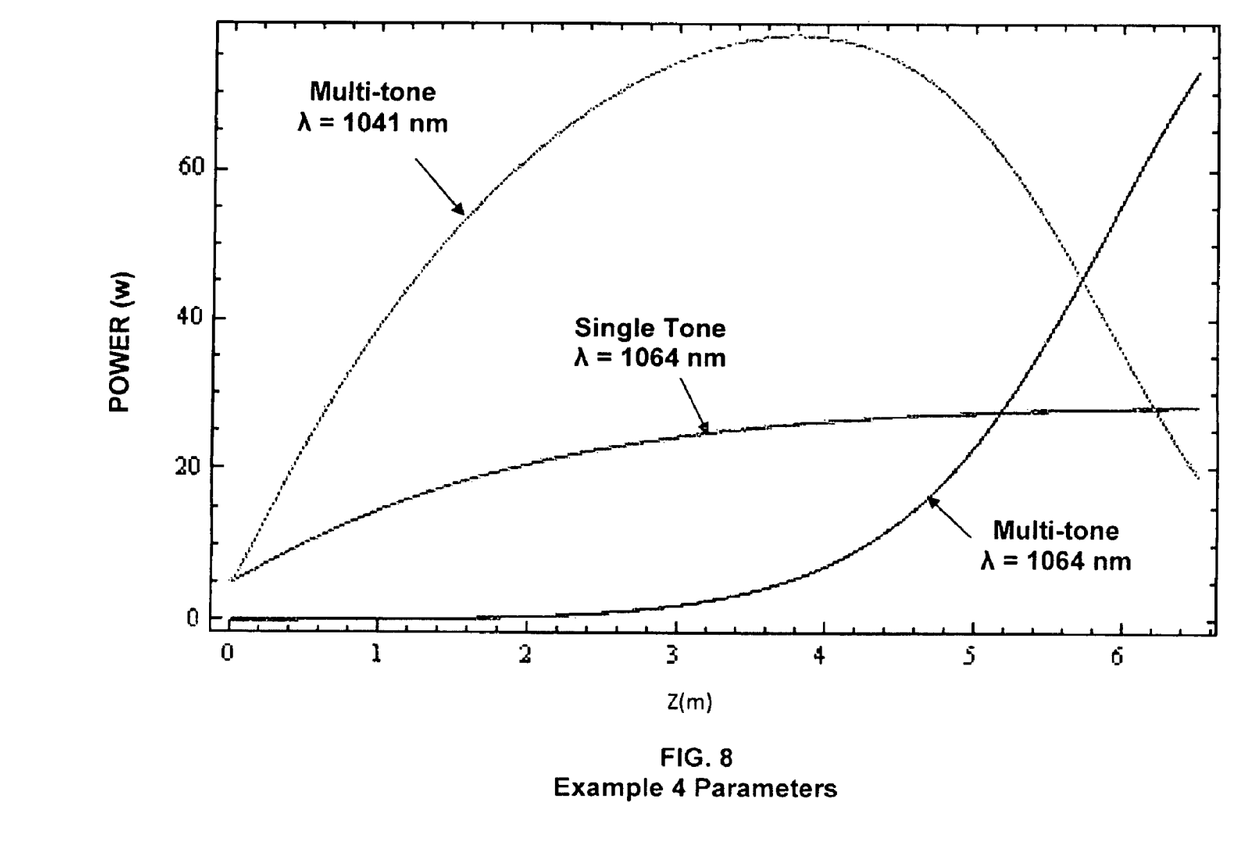
FIG. 8 is a plot of the power vs. gain fiber length (Z) that illustrates the new SBS mitigation technique as per Example 4 with a single tone seeding ($\lambda$=1064 nm) plotted for comparison.
Figure 9:
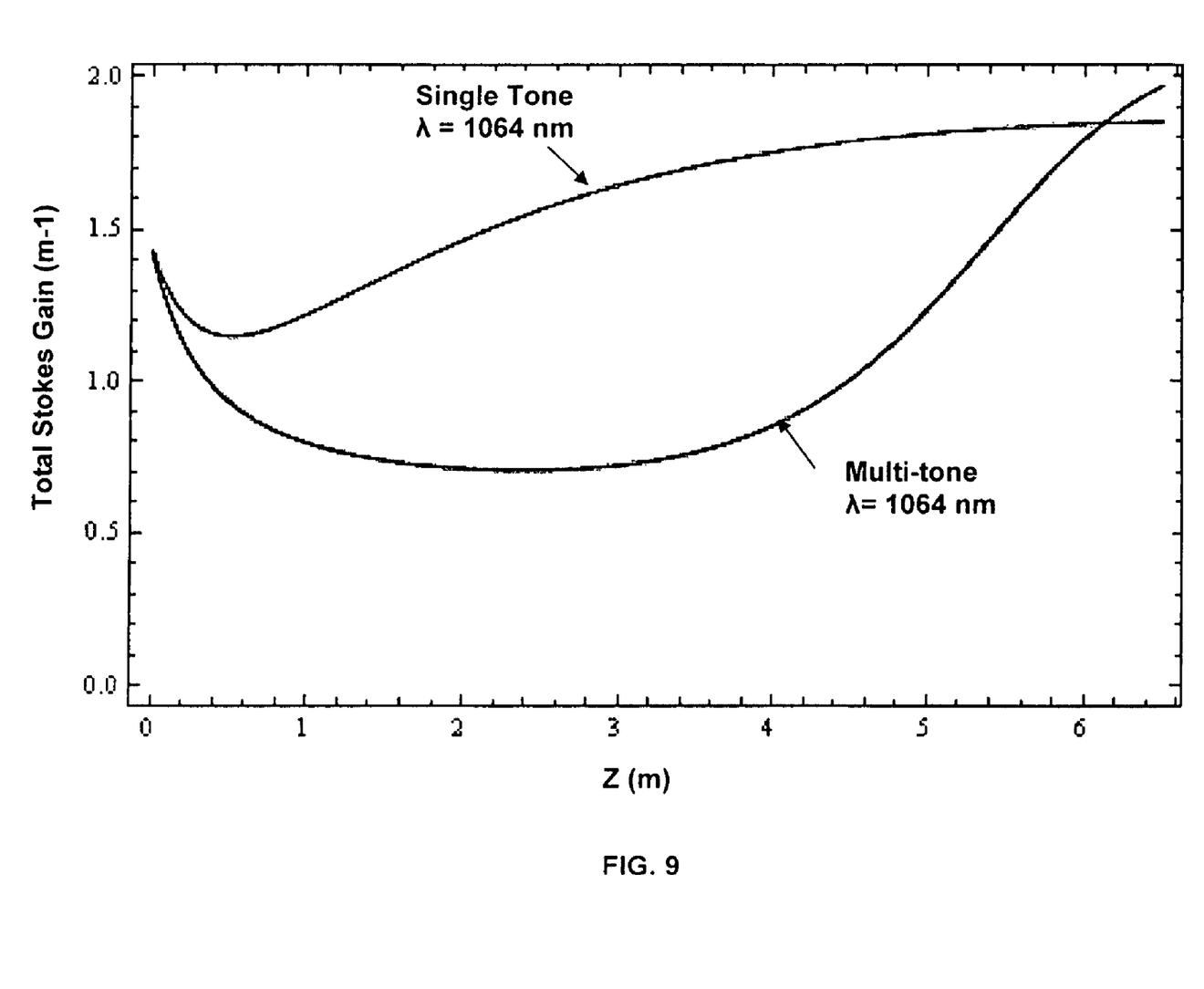
FIG. 9 is a plot showing reduced Stokes gain due to two-tone seeding for a 25/400 Yb-doped fiber amplifier as per Example 4.

Example 4: A 6.5 m Yb-doped fiber with a core mode field diameter (MFD) of 25 μm and an inner cladding MFD of 400 μm. The dopant level in the core is $1.2 \times 10^{26}/m^3$. The amplifier is seeded with broad line width (approximately 400 MHz) 1041 nm beam at an input power of 5 W and narrow line width (<1 MHz) 1064 nm light beam at an input power of 10 mW. The pump wavelength is 977 nm. For single seed input, the maximum power output of this amplifier will be approximately 28 W, while for this two-tone case, 77 W of power will be obtained in the 1064 nm light. FIG. 8 shows the spatial evolution of the two-tone case and compares it to that of the single tone. FIG. 9 illustrates the reduction in the Stokes gain. For comparison purposes, this figure was generated by reducing the pump light for the two-tone case such that the output at 1064 nm was the same as the single-tone case.

The invention claimed is:

1. A method of producing a high-powered narrow linewidth laser output by reducing the stimulated Brillouin scattering effect, the method comprised of:

providing a double clad gain fiber having an outer and an inner cladding and a rare earth doped core such that most of the laser light is contained in the core, said gain fiber having an input and an output end;

splicing a cladding mode stripper at the output end of said gain fiber to thereby couple out unused pump light;

pumping said gain fiber at the input end by a pump source to produce population inversion;

providing a first seed light source and a second seed light source, said first seed source having a linewidth of less than 1 MHz and a wavelength separation of approximately 10 nm or more from said second seed light source, and said second seed source having higher emission and absorption cross-sections than said first seed light source and having at least a four times higher input power level than said first seed source;

optically isolating said seed sources to prevent damage from backward scattered light; and optically combining said first and second seed light sources prior to coupling them into the input end of said gain fiber, whereby said first seed light source may be amplified to provide a high-powered narrow-linewidth laser output of 100 W to more than 1 kW output power.

2. The method of claim 1 wherein a plurality of seed light sources are provided in which a first seed light source has a linewidth of less than 1 MHz and a wavelength separation of at least 10 nm from all other seed light sources, and the other seed light sources have higher emission and absorption cross-sections than said first seed light source and have at least a four times higher input power levels than said first seed source.

3. An apparatus for producing a high-powered narrow linewidth laser output by reducing the stimulated Brillouin scattering effect, the apparatus comprised of:

a double clad gain fiber having an outer and an inner cladding and a rare earth doped core such that most of the laser light is contained in the core, said gain fiber having an input and an output end;

a cladding mode stripper spliced to the output end of said gain fiber to thereby couple out unused pump light;

a pump source to provide pump light into the input end of said gain fiber;

a first seed light source and a second seed light source, said first seed source having a linewidth of less than 1 MHz and a wavelength separation of approximately 10 nm or more from said second seed light source, and said second seed source having higher emission and absorption cross-sections than said first seed light source and having at least a four times higher input power level than said first seed source;

an optical combiner to combine said first and second seed light sources prior to their input into said gain fiber; and optical isolators located between each of said seed sources and said optical combiner to prevent damage from backward scattered light, whereby said first seed light source may be amplified to provide a high-powered narrow-linewidth laser output of 100 W to more than 1 kW output power.

4. The apparatus of claim 1 wherein a plurality of seed light sources is used in which a first seed light source has a linewidth of less than 1 MHz and a wavelength separation of at least 10 nm from all other seed light sources, and the other seed light sources have higher emission and absorption cross-sections than said first seed light source and have at least a four times higher input power levels than said first seed source.

* * * * *

UNITED STATES PATENT AND TRADEMARK OFFICE
CERTIFICATE OF CORRECTION

PATENT NO. : 7,764,720 B1  
APPLICATION NO. : 12/198308  
DATED : July 27, 2010  
INVENTOR(S) : Dajani et al.

Page 1 of 1

It is certified that error appears in the above-identified patent and that said Letters Patent is hereby corrected as shown below:

On the title page, in item (12), column 1, line 2, delete "Bronder et al" and insert --Dajani et al--.

On the title page, in item (75), in "Inventors", column 1, lines 1-3, delete "Timothy J. Bronder, Albuquerque, NM (US); Iyad A. Dajani, Albuquerque, NM (US)" and insert --Iyad A Dajani, Albuquerque, NM (US); Timothy J. Bronder, Albuquerque, NM (US)--.

Signed and Sealed this  
Eighth Day of December, 2015

Michelle K. Lee  
*Director of the United States Patent and Trademark Office*